(12) United States Patent
Kuji (10) Patent No.: US 7,778,955 B2
(45) Date of Patent: Aug. 17, 2010

(54) DATABASE ACCESS SYSTEM AND DATABASE ACCESS METHOD

(75) Inventor: Koji Kuji, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 11/350,611

(22) Filed: Feb. 9, 2006

(65) Prior Publication Data
US 2006/0190491 A1    Aug. 24, 2006

(30) Foreign Application Priority Data
Feb. 23, 2005    (JP)    .............................. 2005-047421

(51) Int. Cl.
*G06F 17/30* (2006.01)
(52) U.S. Cl. ...................................................... 707/10
(58) Field of Classification Search ............... 707/7–10, 707/100–104.1, 200–206, 4; 715/202, 208, 715/115, 234, 239; 717/170; 703/22
See application file for complete search history.

(56) References Cited

U.S. PATENT DOCUMENTS

| | | | | |
|---|---|---|---|---|
| 5,806,062 | A * | 9/1998 | Chen et al. ...................... | 707/4 |
| 6,356,920 | B1 * | 3/2002 | Vandersluis ................... | 715/210 |
| 6,418,448 | B1 * | 7/2002 | Sarkar ...................... | 707/104.1 |
| 6,502,086 | B2 * | 12/2002 | Pratt .............................. | 707/1 |
| 6,718,371 | B1 * | 4/2004 | Lowry et al. ................. | 709/213 |
| 6,721,727 | B2 * | 4/2004 | Chau et al. ...................... | 707/3 |
| 7,290,003 | B1 * | 10/2007 | Tong ........................... | 707/101 |
| 2002/0069192 | A1 * | 6/2002 | Aegerter ........................ | 707/1 |
| 2003/0014397 | A1 * | 1/2003 | Chau et al. ...................... | 707/3 |
| 2005/0050044 | A1 * | 3/2005 | Takagi et al. ................... | 707/6 |
| 2009/0037769 | A1 * | 2/2009 | Babkin et al. ................. | 714/15 |

FOREIGN PATENT DOCUMENTS

| | | |
|---|---|---|
| JP | 63269224 | 11/1988 |
| JP | 2001-282594 A | 1/2001 |
| JP | 2004-151850 A | 10/2002 |
| WO | 00/23917 A1 | 4/2000 |

OTHER PUBLICATIONS

Hayashi, Ko'ichi, etal, Japanese Article "The Native XML Database Introduction Guide," dated Feb. 12, 2008, Dispatch No. 071809, File No. JP9040209, pp. 1-4.

Hayashi, Ko'ichi et al, English Translation "The Native XML Database Introduction Guide," dated Feb. 12, 2008, Dispatch No. 071809, File No. JP9040209, pp. 1-7.

(Continued)

*Primary Examiner*—Diane Mizrahi
(74) *Attorney, Agent, or Firm*—Cantor Colburn LLP; Ronald Kaschak (57) ABSTRACT

Provision of a database access method allowing an open environment such as a Web system to access a main database constituted by a hierarchical database. A system for accessing a hierarchical database, including a storage section for storing schema information related to the hierarchical database converted to tree-structured data, and an access request generating section for generating a second access request to the hierarchical database based on the schema information converted to the tree-structured data corresponding to a first access request.

10 Claims, 4 Drawing Sheets

```
DBD NAME = DB1, ACCESS = HIDAM
DATASET DD1 = DB1DD  BLOCK = 1648 SCAN  = 5
SEGM NAME = A, BYTES = 30,PTR = H, PARENT = 0
FIELD NAME = (KEYA, SEQ, U), BYTES = 5,START = 1, TYPE = C
LCHILD NAME = (INDEX, INDEXDB), PTR = INDX
SEGM NAME = B, BYTES = 20,PTR = H, PARENT = A
FIELD NAME = (KEYB, SEQ, U), BYTES = 4,START = 1, TYPE = C
SEGM NAME = C, BYTES = 40, PTR = H, PARENT = B
FIELD NAME =  FLDC, BYTES = 10,START = 1, TYPE = C
SEGM NAME = D, BYTES = 100, PTR = H, PARENT = B
FIELD NAME =  FLDD, BYTES = 10,START = 1, TYPE = C
SEGM NAME = E, BYTES = 75, PTR = H, PARENT = A
FIELD NAME =  FLDE, BYTES = 10, START = 1, TYPE = C
```

OTHER PUBLICATIONS

Ikeda, Tetsuo, et al., English translation , "An Approach to Schema Construction in Federated Database Systems," vol. 40, No. SIG8 (TOD4) Journal of Information Processing, Nov. 1999, 23 pages.

Ikeda, Tetsuo, etal., Japanese article An Approach to Schema Construction in Federated Database Systems, vol. 40, No. SIG8 (TOD4), Information Processing Society of Japan, Nov. 1999, pp. 1-14.

"Information Processing Handbook," first edition, pp. 302-304, compiled by Information Processing Society of Japan, published by Ohm, May 30, 1989, English translation of previously submitted article.

Iwashiro, Takamasa, et al., "XML Data Management by Object Database," Gunma University, Technology Department, Information Technology Division, 2001.

* cited by examiner

```
PCB      TYPE = DB , DBDNAME = DB1,
         PROCOPT = A, KEYLEN = 22
SENSEG NAME = A, PARENT = 0, PROCOPT = A
SENSEG NAME = B, PARENT = A, PROCOPT = A
SENSEG NAME = C, PARENT = B, PROCOPT = A
SENSEG NAME = D, PARENT = B, PROCOPT = A
SENSEG NAME = E, PARENT = A, PROCOPT = A
```

FIG. 3

```
DBD NAME = DB1, ACCESS = HIDAM
DATASET DD1 = DB1DD  BLOCK = 1648 SCAN  = 5
SEGM NAME = A, BYTES = 30,PTR = H, PARENT = 0
FIELD NAME = (KEYA, SEQ, U), BYTES = 5,START = 1, TYPE = C
LCHILD NAME = (INDEX, INDEXDB), PTR = INDX
SEGM NAME = B, BYTES = 20,PTR = H, PARENT = A
FIELD NAME = (KEYB, SEQ, U), BYTES = 4,START = 1, TYPE = C
SEGM NAME = C, BYTES = 40, PTR = H, PARENT = B
FIELD NAME =  FLDC, BYTES = 10,START = 1, TYPE = C
SEGM NAME = D, BYTES = 100, PTR = H, PARENT = B
FIELD NAME =  FLDD, BYTES = 10,START = 1, TYPE = C
SEGM NAME = E, BYTES = 75, PTR = H, PARENT = A
FIELD NAME = FLDE, BYTES = 10, START = 1, TYPE = C
```

DATABASE ACCESS SYSTEM AND DATABASE ACCESS METHOD

FIELD OF THE INVENTION

The present invention relates to a database access system and a database access method, which make an access to a database in an information processing system. More particularly, the present invention relates to a database access system and a database access method in which a main database to be accessed is a hierarchical database.

BACKGROUND OF THE INVENTION

Conventionally, a hierarchical database (for example, one disclosed in the Information Processing Handbook, page 902) has been adopted as a main database provided in an information processing system, and diverse attempts have also been made to allow an access from a World Wide Web (Web) system to the hierarchical database. For example, there is a method of enabling a Web system to link up with a legacy system by converting a hierarchical database to a relational database, or a method of enabling a Web system to link up with a legacy system by preparing a bridge program for calling or invoking a hierarchical database between the Web system and the legacy system.

The former method of converting the hierarchical database to the relational database is efficient for migrating the legacy system into an open environment. However, conversion of the main data updated daily requires sufficient care for timing of conversion and/or for preservation of consistency of the data. Moreover, in this method, identical data needs to be held in different data formats, resulting in necessity of extra storage capacity for the data to be stored in both formats.

The latter method of employing the intervention of the bridge program for invoking the hierarchical database requires creating the bridge program for enabling it to access the hierarchical database. As a result, a change in the program of the hierarchical database leads to a need to change or update the bridge program. Moreover, any provision of an unconventional access method from the Web system will also lead to the need to change or update the bridge program to respond thereto.

There is also known an access method from the Web system to data constituted by XML data as described in the article "XML Data Management by Object Database," by Iwaki et al. In this description, a database to be accessed is not a hierarchical database, so that an existing hierarchical database might not be used as a main database in this method.

SUMMARY OF THE INVENTION

Although there are several problems in the methods which allow an access from the Web system to the hierarchical database as described above, today's Web systems use a hierarchical database of an existing trunk system in many cases. It has therefore been desired to provide a method of accessing a hierarchical database, which is able to flexibly deal with the change in the program of the hierarchical database or frequent function expansions of the Web system.

It is an object of the present invention to provide a database access system and a database access method, which allow an open environment such as the Web system to access the main database constituted by the hierarchical database.

In order to achieve the object described above, the present invention provides a system for accessing to a hierarchical database, including a storage section that stores schema information related to the hierarchical database converted to tree-structured data, and an access request generating section that generates a second access request to the hierarchical database based on the schema information converted to the tree-structured data corresponding to a first access request.

According to the above-mentioned system, in response to an access to the data in the hierarchical database, the schema information of the hierarchical database is stored in the tree-structured format, which is used to make an access to the hierarchical database.

Hence, the (second) access request is generated by acquiring data through the retrieving of the tree-structured data stored in the storage section as for the (first) access request for allowing the access to the hierarchical database. In this regard, the schema information of the hierarchical database is expanded in the tree-structured data for being used as a virtual database, thereby the second access request is generated for allowing an access to the hierarchical database. Thus, in contrast to the method of converting the hierarchical database to the relational database, it is not required to convert the hierarchical data being updated to the relational database for each updating, and as a result, it is not necessary to take into consideration the appropriate timing of the conversion or the data consistency upon conversion.

Additionally, in contrast to the method of using the intervention of a bridge program for invoking the hierarchical database, it is not required to create the bridge program for accessing the hierarchical database, allowing a flexible cope to any potential change in the program of the hierarchical database.

Moreover, in the present invention, normalness of the data or the program of the hierarchical database can be verified without any actual access to the hierarchical database. In other words, normalness of the hierarchical database can be verified by accessing a virtual tree-structured database instead of directly accessing a data source of the hierarchical database.

More specifically, there is provided a database access system that has a configuration in which the tree-structured data is comprised of a XML data and the storage section is comprised of a storage section that stores the tree-structured data expanded in the Document Object Model (DOM) to allow an access thereto.

According to the present invention, the tree-structured data is described in the Extensible Markup Language (XML) format and the tree-structured data is expanded in the DOM, allowing the hierarchical database to be accessed from the Web system using XPath or the like. Therefore, the present invention makes it possible to describe an interface description for the first access request from the Web system in the XML format, and thus it is able to provide a highly flexible and productive method of accessing the hierarchical database.

According to the present invention, there is provided a database access method capable of allowing an access from an open environment such as a Web system to a main database constituted by a hierarchical database.

DETAILED DESCRIPTION OF THE INVENTION

A preferred embodiment of the present invention will be described hereinbelow with reference to the accompanying drawings.

Figure 1:
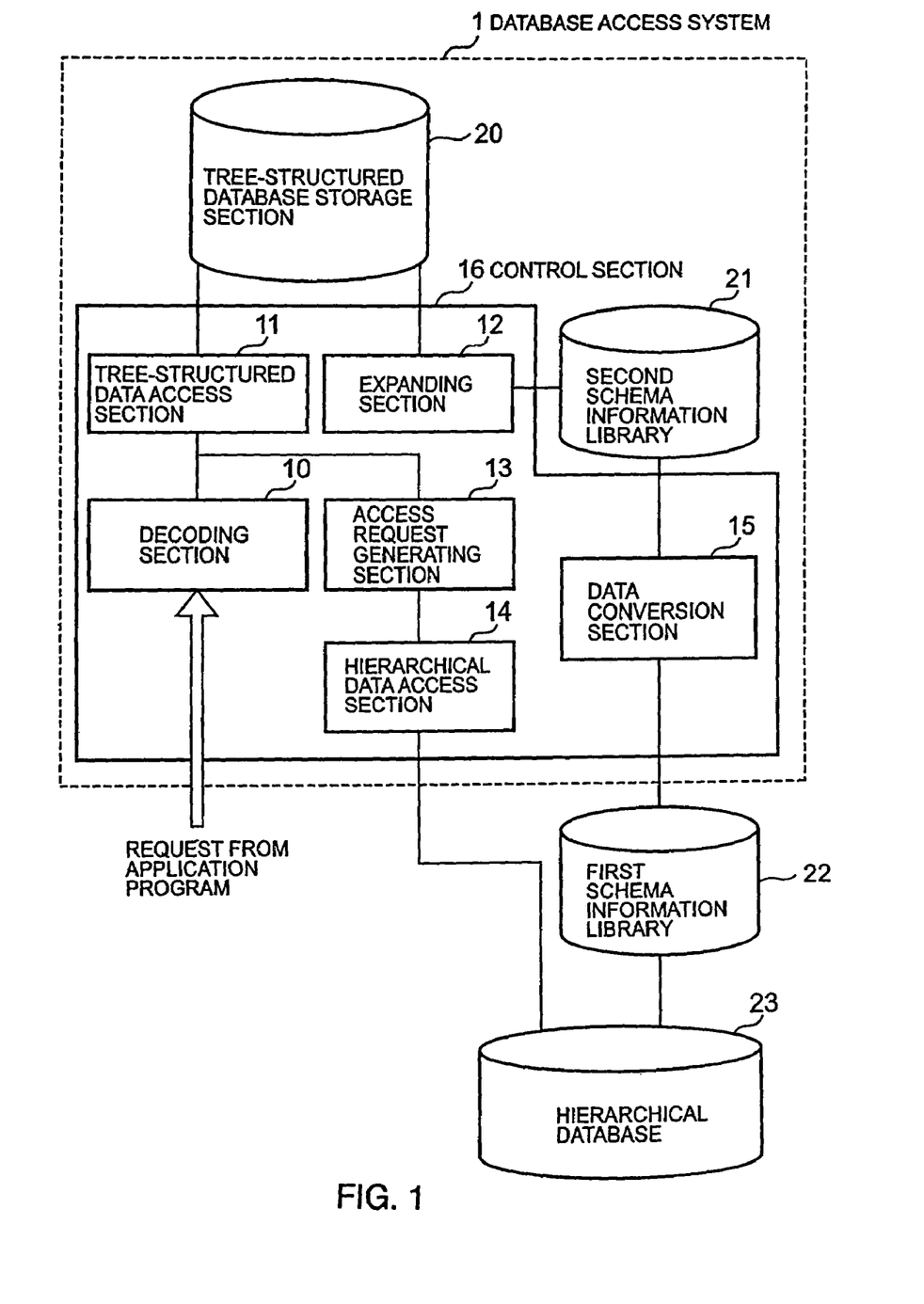
FIG. 1 is a schematic block diagram illustrating a system configuration of a database access system 1.

FIG. 1 illustrates a configuration of a database access system 1 according to the preferred embodiment of the present invention, along with a hierarchical database 23 and a first schema information library 22 that stores therein schema information of the hierarchical database 23. Here, respective sections of the system 1 may be independent units or devices constituting the database access system 1 as a whole. Alternatively, each of the sections constituting the database access system 1 may be a database access device configured by a single hardware.

Upon receiving a request for accessing the hierarchical database 23 from a program (e.g., an application program) of a Web system, the database access system 1 accesses the hierarchical database and answers the application program or the like by providing thereto the access result. Here, the database access system 1 may be configured as an independent hardware device, or may be a computer that stores therein the first schema information library 22 or the hierarchical database 23.

The hierarchical database 23 is a database storing therein hierarchical data, i.e., a main database. Here, the hierarchical data stored in the hierarchical database 23 is hierarchically constructed data that is constructed in a tree structure. Furthermore, the hierarchical database 23 is a database where a path for accessing the data in the hierarchical database is stored in separate libraries (in FIG. 1, the first schema information library 22). DL/I DB and IMS (the registered trademark) DB are known as examples of the hierarchical database 23. The present invention provides a method for accessing the data (source data) stored in the hierarchical database.

The first schema information library 22 stores first schema information of the hierarchical database 23. The first schema information is a description related to the data in the database. In one example, the first schema information may be a path that allows access to the data in the hierarchical database. The first schema information of the hierarchical database includes a Program Specification Block (PSB) as external schema information and a Database Description (DBD) as conceptual schema information. The external schema information and the conceptual schema information herein correspond to an external schema and a conceptual schema of three-level schema architecture due to the ANSI/X3/SPARC, respectively. The first schema information is converted to second schema information by a data conversion section 15, which will be later described.

In the database access system 1, the data conversion section 15 converts, before receiving a request from the application program, the first schema information to the second schema information so as to then store the latter in the second schema information library 21. An expanding section 12 of the database access system 1 expands the second schema information so as to be then stored in a tree-structured database storage section 20. When requested from the application program, the database access system 1 uses the data stored in the tree-structured database storage section 20 to access the hierarchical database 23. Now, operations of the database access system 1 executed from the beginning to storing of the data in the tree-structured database storage section 20 will be described herein below.

The data conversion section 15 converts the first schema information to the second schema information. That is to say, the data conversion section 15 converts the first schema information stored in the first schema information library 22 to the second schema information, and stores the converted second schema information in the second schema information library 21. At this stage, it is to be noted that the second schema information represents the first schema information converted to tree-structured data (e.g., XML data). Upon converting the first schema information to the tree-structured data, the data conversion section 15 may construct the tree structure based on PCB information. Moreover, information related to respective nodes of the tree structure may be attached to the nodes per se. Here, the information to be attached thereto is provided by the Program Specification Block (PSB) or the Database Description (DBD).

The expanding section 12 expands the second schema information stored in the second schema information library 21 to construct the tree-structured database. The second schema information may be expanded in a Document Object Model (DOM). The expanded tree-structured database is stored in the tree-structured database storage section 20. The second schema information may be expanded upon initializing the database access system 1. Namely, the second schema information stored in the second schema information library 21 as the XML data may be expanded in the DOM upon initializing the database access system 1.

The database access system 1 uses the data stored in the tree-structured database storage section 20 to access the hierarchical database 23. An operation of the database access system 1 upon receiving the request from the application program will be hereinafter described.

The database access system 1 includes a control section 16, which is comprised of a decoding section 10, a tree-structured data access section 11, an access request generating section 13, a hierarchical data access section 14, the afore-mentioned data conversion section 15, and the afore-mentioned tree-structured database storage section 20. The control section 16 controls the entire database access system, which may be a central processing unit (CPU). Each of the sections constituting the control section 16 may be configured as hardware or by a software module, respectively.

The decoding section 10 receives a first access request from the application program or the like of the Web system to decode the first access request, i.e., the application program interface (API). At this stage, the access request from the Web system is, for example, an access from the Web system, which may be an access request from the application program operated by such as a Web server to the hierarchical database 23. The access request from the application program operated by the Web server will be described in the followings as an example of an access from the program operated in the Web system.

The decoding section 10 decodes identification information of a database logical specification (PCB: Program Control Block), which becomes accessed objects, and segment search arguments (SSAs), and a function code forming an execution content of the request, from the application program interface (API) to the hierarchical database 23.

Here, the Program Control Block (PCB) is a subset of the PSB. In other words, when the application program requests an access to the hierarchical database, the interface for the access invokes the program specification block (PSB), followed by the PCB within the PSB being invoked as the external schema suitable for the access.

The tree-structured data access section 11 extracts the identification information of the PCB from the request of the application program decoded by the decoding section 10 to identify the PCB. By identifying the PCB, the tree-structured data access section 11 identifies single tree-structured data among the tree-structured data stored in the tree-structure database storage section 20. The tree-structured data access section 11 then extracts the segment search argument (SSA) from the request decoded by the decoding section 10 to identify a single node of the tree-structured data, thereby retrieving the information (e.g., a segment name or a field name of the database) from the identified node required for accessing by the application program.

The access request generating section 13 generates an actual application program interface for the hierarchical database 23 as the second request from the information required for accessing by the application program retrieved by the tree-structured data access section 11. In general, the actual application program interface for the hierarchical database 23 is a database interface (DBI) where the hierarchical database 23 is used for access. In order to generate the interface, an actual address or an actual segment name of the external schema of the database is acquired by retrieving from the tree-structured data.

The hierarchical data access section 14 uses the actual application program interface generated by the access request generating section 13 to access the hierarchical data stored in the hierarchical database 23.

Figure 2:
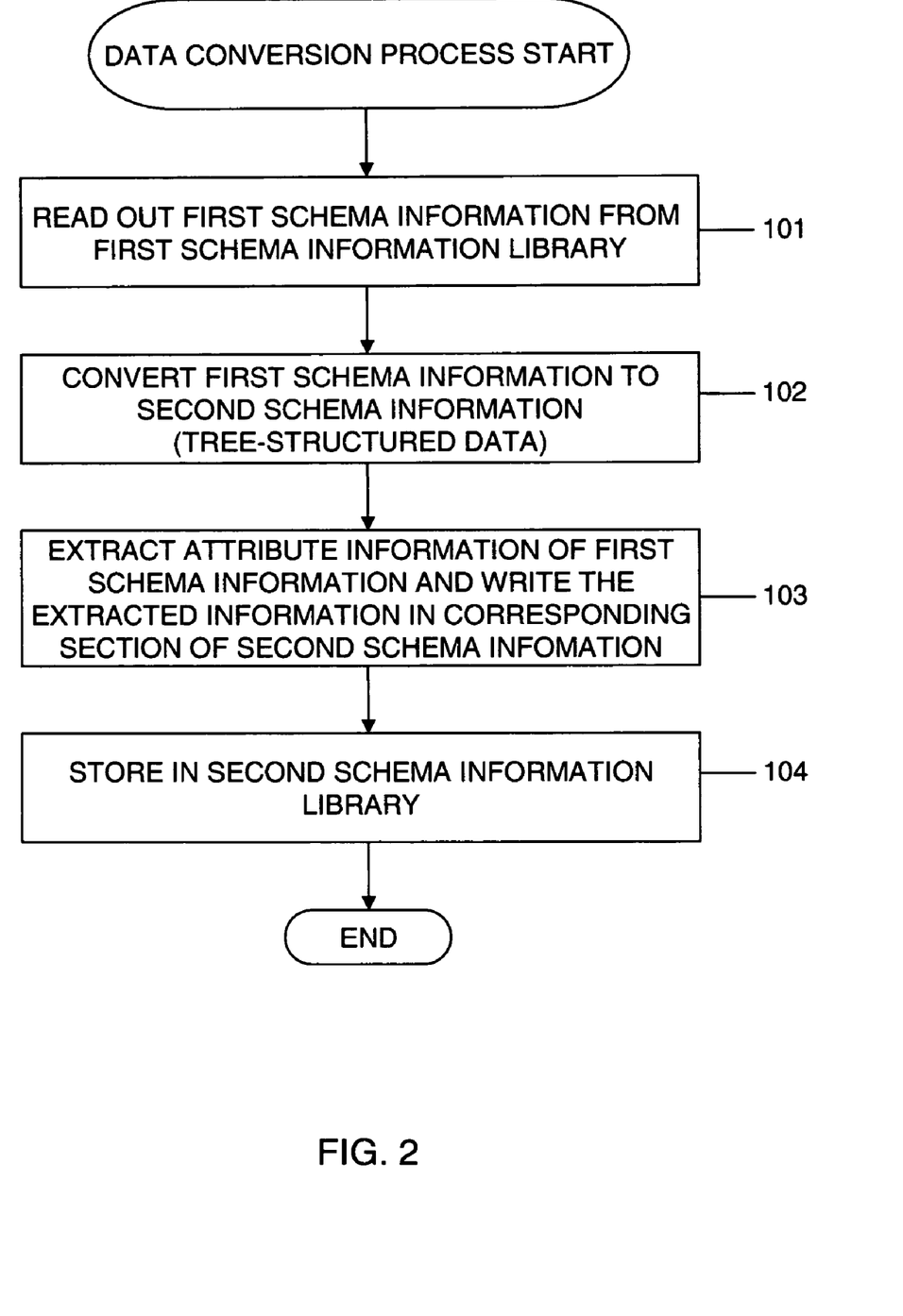
FIG. 2 is a flowchart of a data conversion process according to an embodiment of the present invention.

Next, a data conversion process from the first schema information to the second schema information will be described with reference to FIG. 2. The data conversion process is performed before the hierarchical database 23 is actually accessed for the purpose of converting the first schema information, i.e., the schema information of the hierarchical database 23, to the second schema information.

The data conversion section 15 reads out the first schema information from the first schema information library 22 (Step 101), and converts the first schema information to the second schema information (tree-structured data) (Step 102). Next, the data conversion section 15 extracts attribute information of the first schema information to write the attribute information into the corresponding node of the second schema information (tree structure data) (Step 103). The data conversion section 15 then stores the second schema information in the second schema information library 21 (Step 104).

The first schema information is, for example, information contained in the Program Specification Block (PSB or PCB), i.e., the external schema information, while the attribute information of the first schema information is information contained in the PSB, the PCB, or the DBD. In other words, the data conversion section 15 identifies a structure of the tree-structured data for the second schema information by reading out the hierarchical structure of the data from the PSB or the PCB, and writes the information of the PSB, the PCB and the DBD corresponding to the respective nodes of the tree-structured data.

Figure 3:
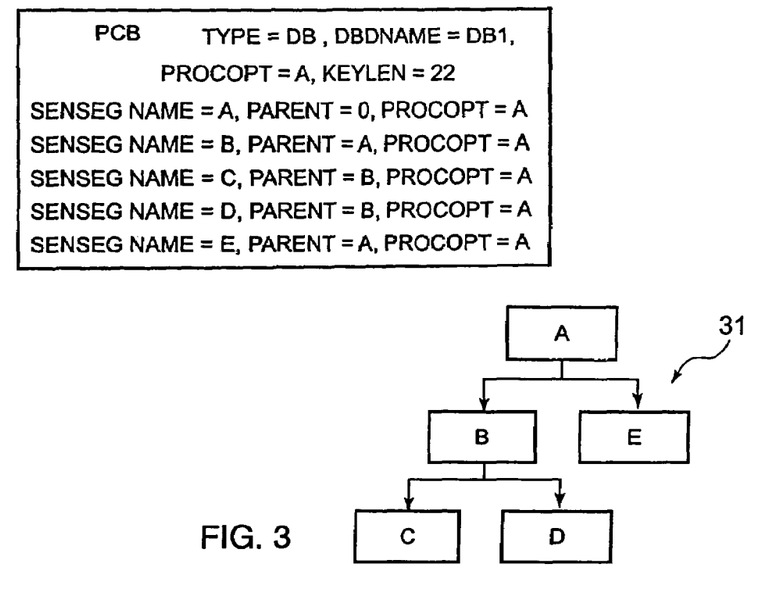
FIG. 3 is a diagrammatic view illustrating an exemplary PCB in a PSB according to the embodiment of the present invention.

The PSB is the external schema information of the hierarchical database 23, which may be comprised of information such as a database name (DBDNAME), an access type to the database (PROCOPT), a segment name (SENSEG), or a hierarchical structure (PARENT) (see FIG. 3). A value of PARENT in this example represents a segment name of a host node in a hierarchy (segment name: A takes the value of 0 because it is the highest node). The data conversion section 15 constructs tree-structured data 31 depending on the segment names. The information other than the segment name may be written in the respective nodes of the constructed tree structure data as the attribute information.

Figure 4:
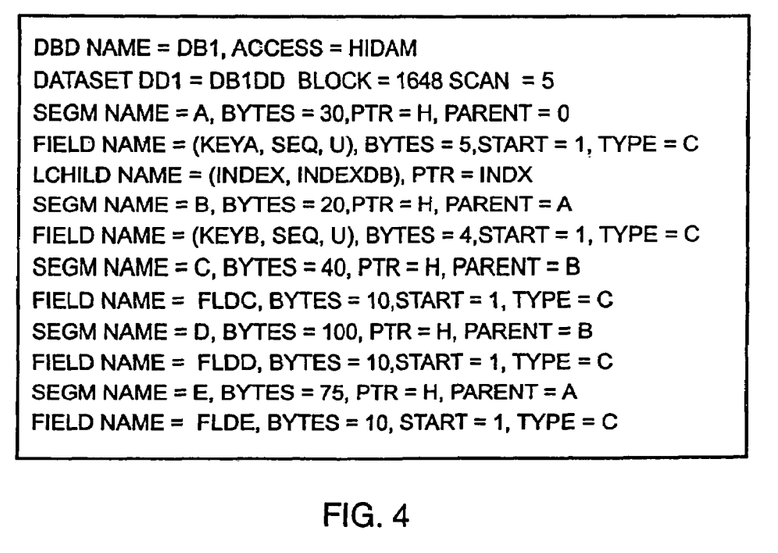
FIG. 4 is a diagrammatic view illustrating an exemplary DBD according to the embodiment of the present invention.

The DBD is the conceptual schema information of the hierarchical database 23 and is the data in which specific information related to the database more detail than that of the PSB stated above is described. The DBD may be comprised of information of, for example, block size information (BLOCK) wherein the database is stored, a segment name (SEGM), a hierarchical structure (PARENT), data size of a segment or a field (BYTES), a maximum length of a key, a key name, a key length or the like. The information may be written in the respective nodes of the constructed tree-structured data as the attribute information.

Table 1 indicates the constructed tree-structured data. The tree-structured data in Table 1 is described in the XML format. The data conversion section 15 constructs the tree structure by setting a tag for every segment to form the node. The data conversion section 15 may write the attribute information of the segment within the tag as shown in the example. In the present invention, the database constituted by the tree-structured data is employed as a virtual database of the hierarchical database 23 for executing an access to the hierarchical data.

TABLE 1

```
<?xml version="1.0"?>
<psb>
    <A bytes=30 ptr=H>
        <B bytes=20 ptr=H>
            <C bytes=40 ptr=H/>
            <D bytes=100 ptr=H/>
        </B>
        <E bytes=75 ptr=H/E>
    </A>
</psb>
```

Next, a flow of the hierarchical database to which an access is executed by the database access system 1 will be described, according to a preferred embodiment of the present invention. An access to the hierarchical database using the conventional technique will be firstly described.

The hierarchical database receives an access request from the application program through the interface shown in Formula 1. The access request set forth below indicates the request to read out the segment A having a-value of field FLD1 equal to or larger than '222222'.

CALL 'CBTDLI' USING 'GUbb', DBI-PCB-MASK,
SEG-IO-AREA, SSA1 SSA1:'Abbbbbbb* - - -
(FLD1bbbb>=222222)' [Formula 1]

At this stage, CBTDLI is an example of an application program interface (API) name of the database, and is an application example for the Common Business Oriented Language (COBOL). The following "GUbb" is an example of the function code. The function code identifies an action executed against the data source. Here, the action is, for example, to acquire or retrieve data, to replace data, to delete data, to read data of a higher node of a segment, or to read data without allowing other writing. The respective function codes will be described hereinbelow.

The function codes include following examples.

| | |
|---|---|
| "GUbb" | Get Unique |
| "GHUb" | Get Hold Unique |

| | |
|---|---|
| "GNbb" | Get Next |
| "GHNb" | Get Hold Next |
| "GNPb" | Get Next in Parent |
| "GHNP" | Get Hold Next in Parent |
| "ISRT" | Insert |
| "REPL" | Replace |
| "DLET" | Delete |

While the function codes, which begin with G representing Get, are used to read the segment, the function code to be used varies depending on how to read the segment. "GUbb" is used to read a specific (Unique) segment by designating a key. "GHUb" represents "GUbb" having Hold attached thereto upon being read, and is intended to be followed by a next command of replacement (REPL) or deletion (DELT). In other words, when this function code is used, the data is read after being locked for an exclusive access control to prevent occurrence of any data inconsistency due to another concurrent access during a replacing or deleting process. H herein represents Hold of the lock. "GNbb" means to read a next segment (Next) or a subsequent segment of the currently read segment. "GHNb" represents "GNbb" with Hold. "GNPb" is used to read a first dependent segment (child segment) of the current segment (parent segment) in the hierarchical structure.

For example, "GNPb" allows a dependent child segment to be read after reading a parent segment thereof by using "GUbb" or "GNbb". This function code can be utilized, for example, to read a segment of a certain bank account number (parent segment information) and then to read a bank statement thereof (child segment information). "GHNP" represents "GNPb" with Hold. "ISRT" is used for inserting a new segment. "REPL" is used for replacing a segment. "DLET" is used for deleting a segment.

DB1-PCB-MASK is the identification information of a database logic specification, which indicates that DB1 is a name of the database and that the PCB within the PSB stores the schema information. SEG-IO-AREA is the information related to an input/output destination of the action corresponding to the function code.

SSA1 is a segment search argument which is the information identifying a target of the action in the hierarchical database 23. Here, the target segment A is the segment A having a value of field FLD1 equal to or larger than '222222'. "Abbbbbbb" represents an actual segment of the segment A (the physical location of the segment). Symbol "b" represents a blank. "FLD1bbbb" represents a field name.

In the conventional hierarchical database, a database management program such as IMS accesses the schema information such as the PSB or the DBD through the application program interface (API) to read an address or a key of the actual data source (actual address) for accessing the data source.

Figure 5:
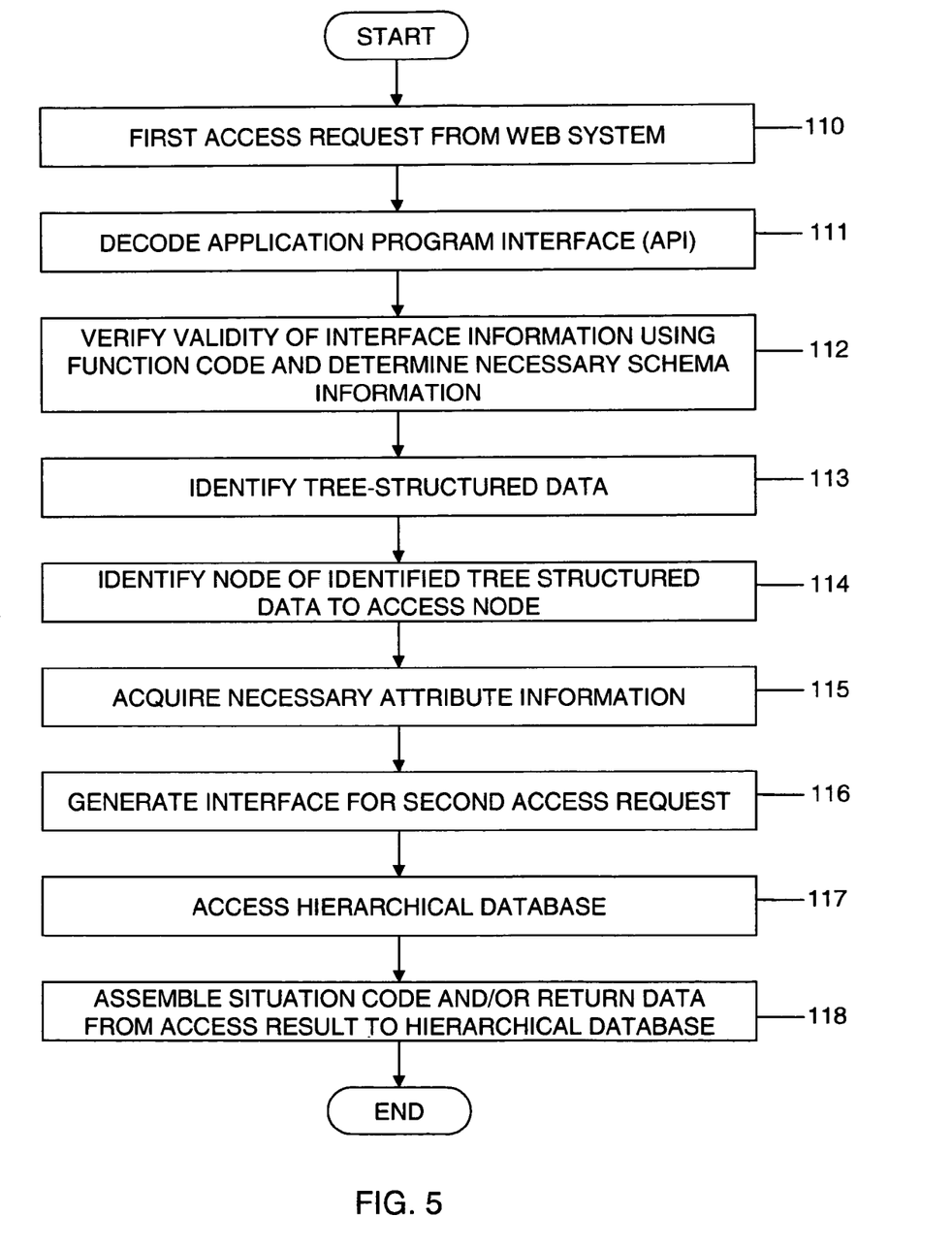
FIG. 5 is a flowchart upon receiving an access from the application program.

Next, a flow of the access request from the program of the Web system to the hierarchical database will be described as an embodiment of the present invention, with reference to FIG. 5 (hereinafter, an access from the application program of the Web system will be described).

First, the decoding section 10 receives an access from the application program to the hierarchical database 23 (Step 110). Table 2 indicates an example of the interface receiving the access from the application program. Since the application program herein is designed to operate in the Web system, it is described in the XML format as shown in the example.

TABLE 2

```
<?xml version="1.0"?>
<xmltdli>
    <func>GU</func>
    <dbid>DB1</dbid>
    <ioarea>SEGIOAREA</ioarea>
    <statarea>STATAREA</statarea>
    <ssa1>
        <segname>A</segname>
        <fldname>FLD1</fldname>
        <opcode>GE</opcode>
        <value>222222</value>
    </ssa1>
<xmltdli>
```

Next, the decoding section 10 decodes the interface being accessed (Step 111). The decoding section 10 decodes the identification information of the database logic specification (the PCB within the PSB) to be decoded, the access request search argument (SSA), and the function code as the execution content of the access request. In this example, a <func> tag corresponds to the function code that is decoded to be GUbb, a <dbid> tag corresponds to the database name that is decoded to be DB1, an <ioarea> tag corresponds to SEG-IO-AREA, a <ssa1> tag corresponds to SSA1. Contents of SSA1 are a <segname> tag corresponding to the segment name which is decoded to be A, a <fldname> tag corresponding to the field name which is decoded to be FLD1, an <opcode> tag corresponding to a determination element which is decoded to be "above", and a <value> tag corresponding to the value, which is decoded to be "222222".

The decoding section 10 decodes the accessed interface and verifies the validity of the interface information using the decoded function code to determine the schema information necessary for the access (Step 112). Here, the decoding section 10 may use a parsing routine such as the XML parser or the like.

Meanwhile, the tree-structured data access section 11 identifies the tree-structured data from the identification information of the PCB within the decoded PSB (Step 113). In other words, the database to be accessed is the tree-structured data stored in the tree structure database storage section 20 considered as the virtual database. The specific tree-structured data is identified from a plurality of tree-structured data using the identification information of the PCB within the PSB.

Next, the tree-structured data access section 11 identifies the node of the tree-structured data to be accessed using the decoded segment search argument (SSA) to access the node (Step 114). Here, the node corresponds to the segment of the hierarchical database, which may be an <A> tag indicated in Table 1.

The tree-structured data access section 11 accesses the node of the tree-structured data to acquire by retrieving the necessary attribute information (Step 115). The necessary attribute information is, for example, the actual address of the external schema (the PCB within the PSB) required for actually accessing the hierarchical database. The interface per se indicated in Table 2 does not contain the information related to the actual address name or the actual segment name of the schema information of the database to be accessed. Therefore, the tree-structured data access section 11 accesses the node to acquire the actual segment name and the actual field name as the attribute information. The examples thereof are the attribute information indicated in Table 1, i.e., "Abbbbbbb" or "FLD1bbbb".

The access request generating section 13 generates the interface using the information decoded by the decoding section 10 or the retrieved attribute information (Step 116). More specifically, the interface indicated in Formula 1 is generated using the retrieved information. Then, access to the hierarchical database is executed by using the generated interface (Step 117). The access to the hierarchical database can be identical with that from the conventional interface, it can be achieved needing no particular process for the access from the database access system 1. Thereafter, on the basis of the result of access to the hierarchical database, the situation code and the return data are assembled (Step 118).

The database access system and the database access method of realizing such embodiments can be accomplished by a program that is implemented by either a computer or a server. A storage medium for the program may include an optical storage medium, a tape medium, a semiconductor memory, or the like. A storage unit such as a hard disk or a RAM disposed in a server system connected to an exclusive communication network or the Internet may be used as a storage medium to provide the program via a network.

As will be understood, upon operating the program realizing such embodiments in the database access system 1, each of the sections of the database access system 1 may be comprised of a plurality of devices or units which respectively perform a subprogram corresponding thereto, or the embodiments described above may be otherwise attained by the database access system 1 comprised of a single hardware unit performing the program. Furthermore, the decoding section 10, the tree-structured data access section 11, the expanding section 12, the access request generating section 13, the hierarchical data access section 14, and the data conversion section 15 may be realized by the programs corresponding thereto being read out using the control section 16.

While the description of the embodiments of the present invention have been provided hereinabove, it is to be noted that these embodiments are intended to merely illustrate several concrete examples without specifically limiting the present invention thereto. The advantageous effects of the present invention are not limited to the effects described in connection with the embodiments of the present invention, which are shown only as the most preferable effects exhibited by the present invention.

The invention claimed is:

1. A method for accessing data comprising:
identifying a first schema information library, wherein the first schema information library includes first schema information which contains a data access path to data in a hierarchical database, external schema information, and conceptual schema information;
converting using a computer memory, the first schema information to second schema information, wherein the second schema information is tree-structured data;
storing the second schema information in a second schema information library;
expanding the second schema information to define a tree-structured database;
storing the tree-structured data information in a tree-structured database storage section;
receiving a first access request from an application program for data contained in the hierarchical database;
identifying, in response to the step of receiving, a single node of the tree-structured data information, wherein the single node contains information required to access the data in the hierarchical database;
generating a second access request from the information retrieved from the single node; and
using the second access request to access the data in the hierarchical database.

2. A method according to claim 1, wherein information relating to the respective nodes of the tree-structure are attached to the nodes themselves.

3. A method according to claim 1, wherein the second schema information is expanded into a document object model.

4. A method according to claim 1, wherein the step of expanding occurs as part of the initialization of the hierarchical database.

5. A method according to claim 1, wherein the tree-structured data is XML data.

6. A system for accessing data comprising:
a computer operative to identify a first schema information library, wherein the first schema information library includes first schema information which contains a data access path to data in a hierarchical database, external schema information, and conceptual schema information, convert the first schema information to second schema information, wherein the second schema information is tree-structured data, store the second schema information in a second schema information library, expand the second schema information to define a tree-structured database, store the tree-structured data information in a tree-structured database storage section, receive a first access request from an application program for data contained in the hierarchical database; identify, in response to the step of receiving, a single node of the tree-structured data information, wherein the single node contains information required to access the data in the hierarchical database, generate a second access request from the information retrieved from the single node, and use the second access request to access the data in the hierarchical database.

7. The system of claim 6, wherein information relating to the respective nodes of the tree-structure are attached to the nodes.

8. The system of claim 6, wherein the second schema information is expanded into a document object model.

9. The system of claim 6, wherein the step of expanding occurs as part of the initialization of the hierarchical database.

10. The system of claim 6, wherein the tree-structured data is XML data.

* * * * *